United States Patent [19]

Takemura

[11] Patent Number: 5,264,944
[45] Date of Patent: Nov. 23, 1993

[54] MULTI-FUNCTION DIGITAL CCD CAMERA
[75] Inventor: Yasuo Takemura, Tokyo, Japan
[73] Assignee: Kabushiki Kaisha Toshiba, Kawasaki, Japan
[21] Appl. No.: 677,343
[22] Filed: Mar. 29, 1991
[30] Foreign Application Priority Data
Mar. 30, 1990 [JP] Japan .................................... 2-84635
[51] Int. Cl.$^5$ ................................................ H04N 5/76
[52] U.S. Cl. ..................................... 358/335; 358/906; 358/213.13
[58] Field of Search ................. 358/209, 906, 909, 75, 358/80, 335, 41

[56] References Cited

U.S. PATENT DOCUMENTS

| | | | |
|---|---|---|---|
| 4,460,919 | 7/1984 | Takemura | 358/44 |
| 4,647,975 | 3/1987 | Alston et al.1 | 358/209 |
| 4,660,101 | 4/1987 | Martin | 358/342 |
| 4,714,966 | 12/1987 | Saito et al. | 358/335 |
| 4,839,734 | 6/1989 | Takemura | 358/213.22 |
| 4,951,147 | 8/1990 | Aknar et al. | 358/209 |
| 4,964,004 | 10/1990 | Barker | 360/14.1 |
| 4,987,552 | 1/1991 | Nakamura | 364/521 |
| 5,003,404 | 3/1991 | Yoshimura et al. | 358/335 |
| 5,008,757 | 4/1991 | Kimura et al. | 358/909 |
| 5,070,405 | 12/1991 | Ejima et al. | 358/909 |
| 5,079,624 | 1/1992 | Sasuga et al. | 358/75 |
| 5,101,276 | 3/1992 | Ohta | 358/909 |

FOREIGN PATENT DOCUMENTS 1121034  5/1989  Japan ..................................... 358/98

OTHER PUBLICATIONS

Takemura et al., New Field Integration Frequency Interleaaving Color Television Pickup System For Single-Chip CCD Camera, IEEE Transactions on Electron Devices, vol. ED 32, No. 8 Aug. 1985, pp. 1402-1406.

Tonaka, "3-D Digital Picture Effect Equipment DPE-X", JEE, vol. 25, Mar. 1988, No. 255, Tokyo, Japan.

*Primary Examiner*—Michael T. Razavi
*Assistant Examiner*—Joseph Colaianni
*Attorney, Agent, or Firm*—Cushman, Darby & Cushman

[57] ABSTRACT

In a multi-function digital CCD camera according to the present invention, the image signal outputted from the solid-state image pick-up device is inputted into a signal processing circuit where the signal is shaped into an image signal. The image signal from the signal processing circuit is inputted into the image quality changeover circuit having a plurality of signal processing paths, each with a peculiar signal processing characteristic. In the image quality changeover circuit, the plurality of signal processing paths are combined based on a control signal from the image quality selective circuit. The image signal obtained from respective signal processing paths are inputted into the image composition circuit. The signal obtained from the image composition circuit is inputted into the color encoder where the signal is encoded into a camera output video signal.

11 Claims, 12 Drawing Sheets

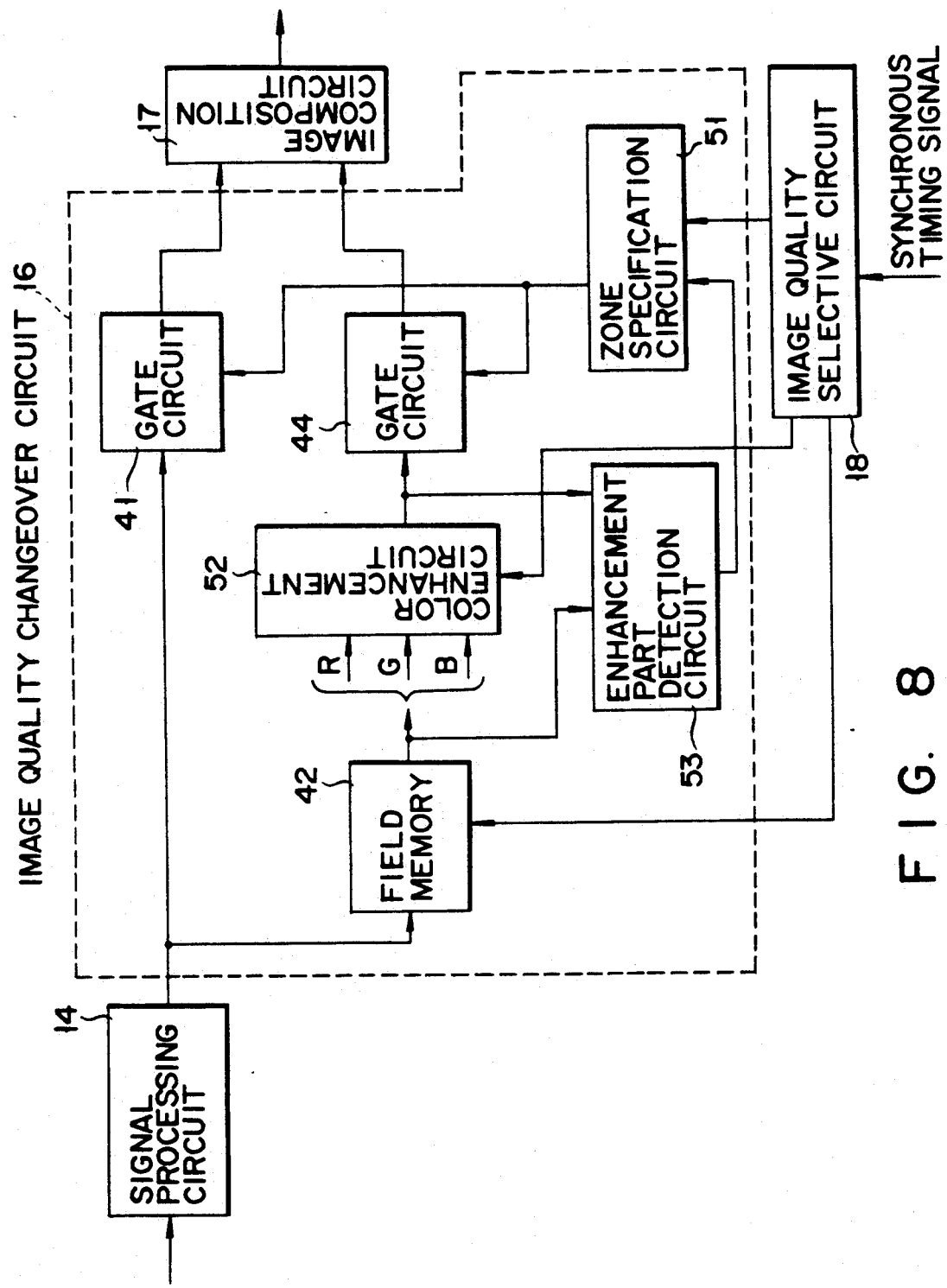
F I G. 8

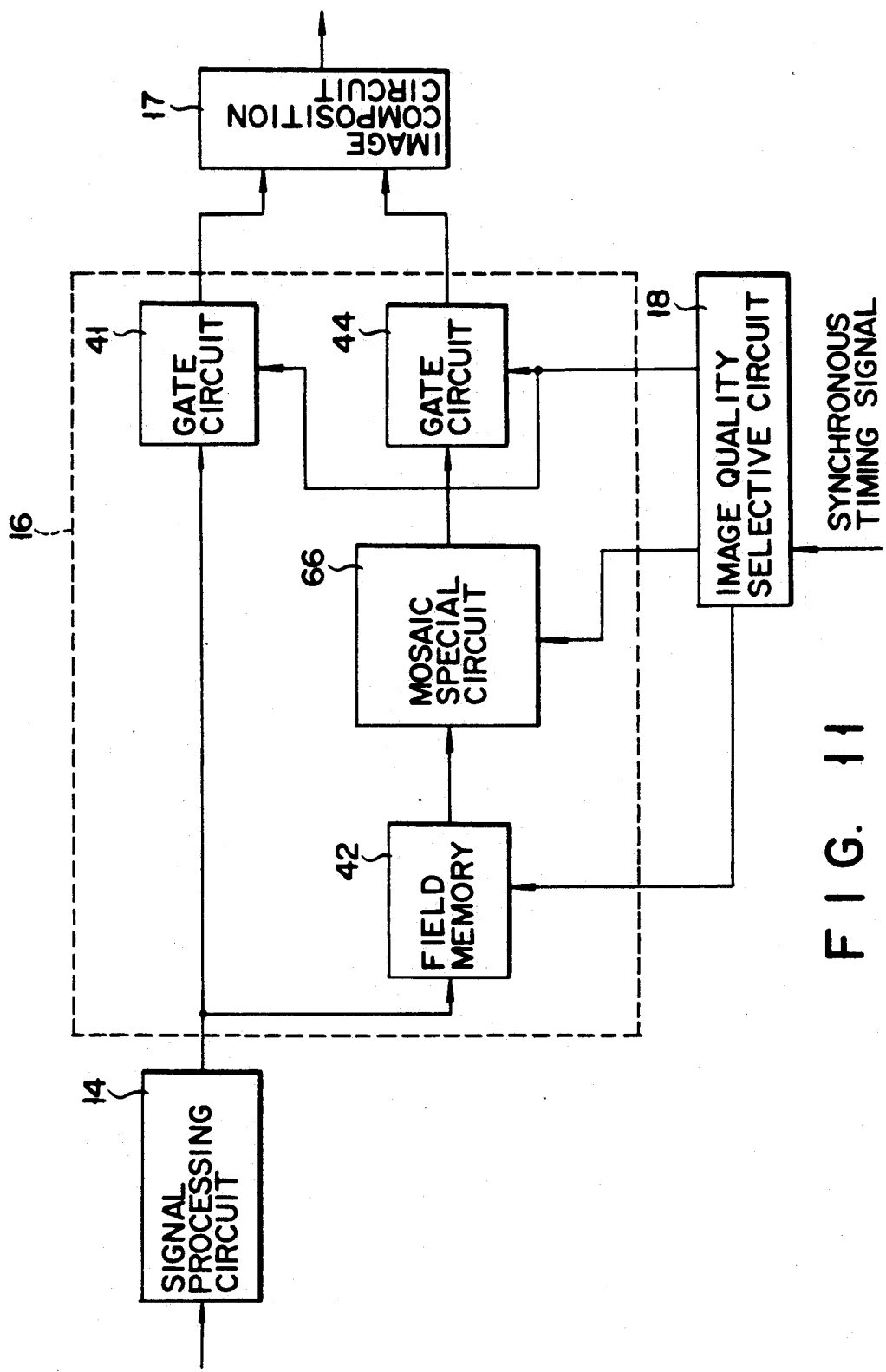
F I G. 11

MULTI-FUNCTION DIGITAL CCD CAMERA

BACKGROUND OF THE INVENTION

1. Field of the Invention

The present invention relates to a multi-function digital Charge-Coupled Device (CCD) camera for obtaining an image pick-up signal by a solid-state image pick-up device using the CCD.

2. Description of the Related Art

Recently, a color camera using a solid-state image pick-up device has been developed. The camera has been used as video cameras for household purposes, as studio cameras and ENG (Electronics News Gathering) cameras for broadcast purposes, and as monitor cameras, industrial cameras and medical cameras for business purposes.

However, any of such electronic cameras has a single function of picking up the image of a subject.

Although the electronic cameras of prior art have only the single function of image picking up, various signal processing circuits are required in the image processing field. Accordingly, additional attachments are necessary to obtain a special effect such as image composition. Such attachments, however, cause the system utilizing the camera to become elaborate, which is not desirable with respect to space and initial cost.

SUMMARY OF THE INVENTION

An object of the present invention is to provide a multi-function digital CCD camera which can perform various image processings by being provided with an image processing function and has a variety of convenient uses.

A digital CCD camera according to the present invention has an image pick-up lens for picking up a light from a subject, a solid-state image pick-up device for obtaining a photoelectrically transferred output by receiving on an imaging surface an optical image imaged through the image pick-up lens, and a signal processing circuit for shaping the photoelectrically transferred output of the solid-state image pick-up device into an image signal. The camera comprises image quality control means to which a plurality of image signals pass, including at least the image signal from said signal processing circuit. The image signals pass through processing paths, each path having a peculiar characteristic. The camera further comprises for composition to obtain an output image signal, image quality selective means which determine respective signal processing characteristics of said processing paths, each with a peculiar characteristic, of the image quality control means according to external operation, and an encoder to which the output image signal from said image quality control means is supplied and which encodes the signal into a video signal with a required mode.

According to the above-mentioned arrangement, the image quality control means allows the image signals to have different special effects in the CCD camera. The arrangement is such that the signal processing is performed in the camera, whereby a desired image can be immediately obtained without requiring a special processing device to allow the signals to have a special effect after image picking up. The disadvantage of the CCD camera is also made up, thereby improving the performance thereof. Providing the image quality selective means and the image quality control means permits the camera to function as a system with a high flexibility in performing various image processings.

BRIEF DESCRIPTION OF THE DRAWINGS

FIGS. 5 through 12 are block diagrams showing respective other embodiments of the present invention.

DETAILED DESCRIPTION OF THE PREFERRED EMBODIMENTS

With reference to drawings, the embodiments of the present invention will be explained hereinafter.

Figure 1:
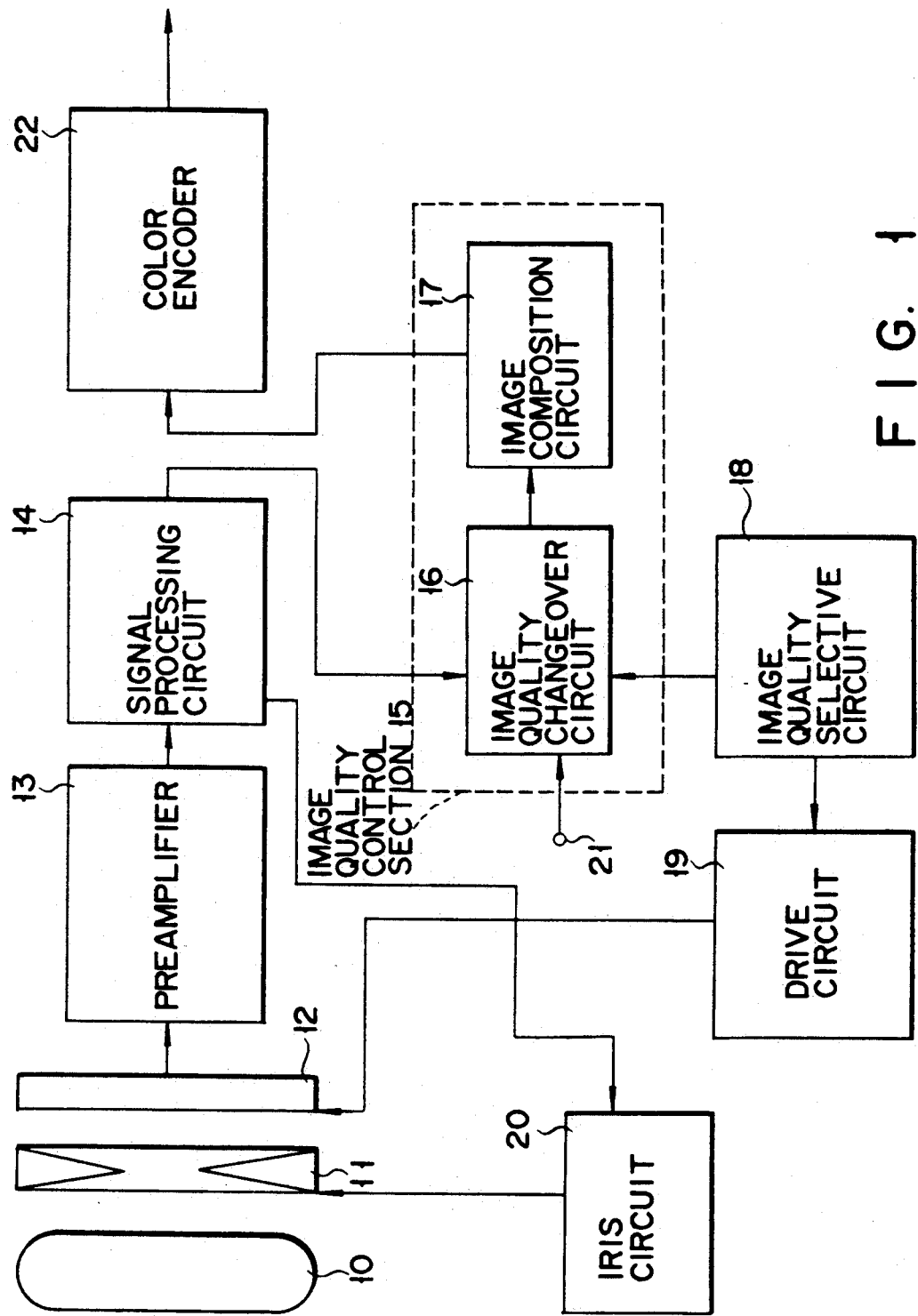
FIG. 1 is a block diagram showing one embodiment of the multi-function digital CCD camera according to the present invention.

FIG. 1 shows one embodiment of the present invention. An optical image introduced through an image pick-up lens 10 is imaged through an iris section 11 on the photosensitive surface of a solid-state image pick-up device 12. An image signal corresponding to an electric charge photoelectrically transferred is obtained from the solid-state image pick-up device 12, and inputted into a preamplifier 13. An output from the preamplifier 13 is inputted into a signal processing circuit 14, where the separation of R, G and B components and the generation of a luminance signal Y are performed to produce a image signal.

The image signal obtained by the signal processing circuit 14 is inputted into an image quality changeover circuit 16 of an image quality control section 15. The signal processing circuit 14 can output the image signal continuously with respect to time, and has a frame memory, whereby the circuit can also output a plurality of image signals in parallel.

The image quality changeover circuit 16 processes a plurality of image signals. At this point, the respective image signals are passed through processing paths, each with a different characteristic, and then supplied to an image composition circuit 17 where the signals are composed. What characteristic of processing is to be applied to respective image signals in the image quality changeover circuit 16 is determined by an image quality selective circuit 18. The image quality selective circuit 18 sets processing types of the respective image signals in a plurality of signal processing paths of the image quality changeover circuit 16. At this point, depending on the processing types, changing the shutter speed and timing in the solid-state image pick-up device 12 may become necessary. Therefore, the selection information of the image quality selection circuit 18 is also supplied to a drive circuit 19 for controlling the solid-state image pick-up device 12 (an example of which will be explained in FIG. 2). Reference numeral 20 indicates an iris circuit for controlling automatically the opening of the iris according to the mean level of the image signals in the signal processing circuit 14. The control is performed in such a manner that the iris opening is made large when the mean level is low, and made small when the mean level is high. An output of the image composition circuit 17 is inputted into a color encoder 22 where the inputted signal is converted into a video signal with a required mode.

Into the image quality changeover circuit 16 may be successively inputted image signals imaged a plurality of times from the signal processing circuit 14, or may be supplied respective signals from signal processing circuit 14 and an external terminal 21.

Figures 2A, 2B:
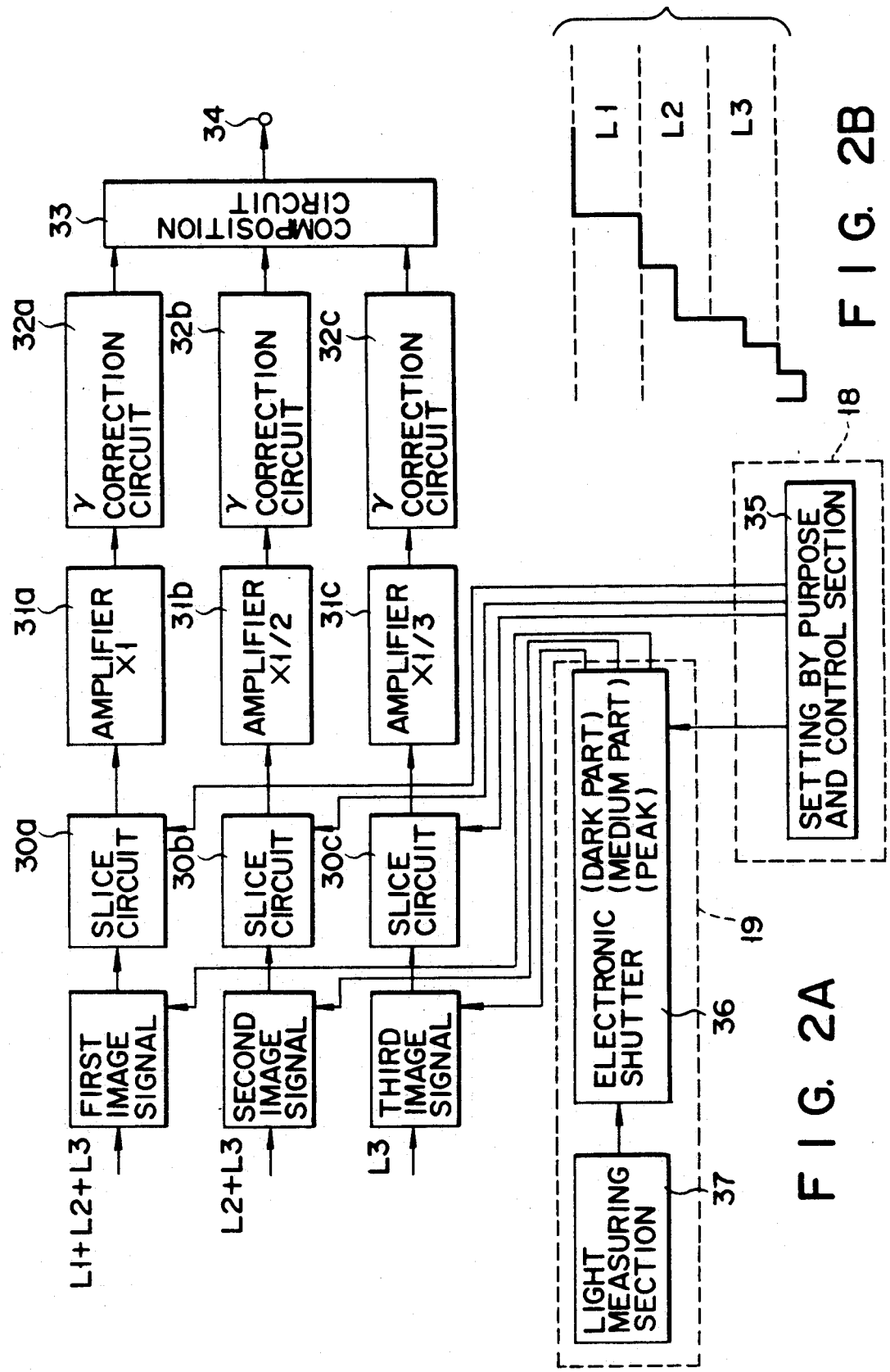
FIGS. 2A and 2B are circuit diagrams showing one example of the image quality control section in FIG. 1.

FIG. 2 (A) shows an example of definite arrangement of the above-mentioned image quality changeover circuit 16 and image composition circuit 17. FIG. 2 (B) shows an example of the waveform of an image signal picked up normally, where references L1, L2 and L3 indicate components divided by the level of the signal. The circuit in FIG. 2 (A) is arranged in a manner to make up the disadvantage of a narrow dynamic level of electronic cameras. The mode in which the circuit is operated will be temporarily called the intellectual picture pick-up mode by hierarchy hereinafter.

Although the signal processing circuit 14 can output a plurality of image signals in parallel a previously mentioned, the circuit outputs a first, a second and a third image signals, each with a peculiar shutter time, in such operation mode. To obtain the image signals, the image quality selective circuit 18 is set to the intellectual picture pick-up mode by hierarchy, and the set information is transferred to a drive circuit 19. At this point, the drive circuit 19 has the solid-state image pick up device 12 perform three shutter operations for each shutter operation.

An image signal obtained with the shutter time made shortest is rendered the first image signal, an image signal with the shutter time made medium rendered the second image signal, and an image signal with the shutter time made longest rendered the third image signal. The respective image signal having different shutter times can be said to be a follows.

The first image signal is an overall image pick-up signal which covers the light part to dark part of a subject (including the components L1 to L3) and in which the image of the light part, in particular, appears clearly. This is because, in a higher shutter speed set condition, the iris circuit 20 has been set to control the iris in a manner to make clear the light part of the subject. The second image signal is a signal in which the image of the medium part (components L2 and L3) between the light part and the dark part of the subject appears clearly since the shutter time becomes somewhat longer in the above-mentioned iris condition. The third image signal is a signal in which the image of the dark part of the subject (component L3) appears clearly since the shutter time becomes further longer in the above-mentioned iris condition.

The above-mentioned first, second and third image signals are inputted into slice circuits 30a, 30b and 30c, each with a peculiar characteristic, respectively. Control signals from the image quality selective circuit 18 are supplied to the slice circuits 30a, 30b and 30c, which are controlled in a manner to provide a different slice level from each other, respectively. Outputs from the slice circuits 30a, 30b and 30c are inputted into amplifiers 31a, 31b and 31c, each with a peculiar amplification factor, respectively, where the inputted signals are amplified, and the respective amplified outputs are inputted into γ correction circuits 32a, 32b and 32c, respectively. Then, the output signals thus γ corrected are inputted into a composition circuit 33, where the inputted signals are composed, and introduced and outputted to an output terminal 34 as one image signal.

A setting by purpose and control section 35 is provided in the image quality selective circuit 18 to set the processing path characteristic and the shutter time of respective image signals. In the intellectual picture pick-up mode by hierarchy, the setting by purpose and control section 35 sets respective slice levels, as explained in FIG. 3, for the slice circuits 30a, 30b and 30c and performs control in a manner to obtain image signals in which the respective dark part, the medium part and the light part of the subject have been made clear from the respective circuits. The control information of the setting by purpose and control section 35 is also inputted into an electronic shutter control section 36 included in the drive circuit 19.

The electronic shutter control section 36 receives the luminous energy from a light measuring section 37 having a photo-sensor and determines automatically a shutter time (shortest time) to obtain the first image signal, a shutter time (medium time) to obtain the second image signal, and a shutter time (longest time) to obtain the third image signal so as to control the solid-state image pick-up device 12.

In the normal picture pick-up mode, the electronic shutter control section 36 is arranged to set the shutter time based on the luminous energy measurement information from the light measuring section 37 in such a manner that the light part of the subject is clearly imaged.

For example, the arrangement is such that, based on the luminous energy measurement information, the control section uses the data from a ROM (for standard) for light part where the data is previously recorded, controls a dividing factor of a divider, and determines the shutter time according to the output of the divider. However, in the intellectual picture pick-up mode by hierarchy, the first image signal, the second image signal and the third image signal are required to obtain, based on the luminous energy measurement information for each three successive picture pick-ups, the data from the ROM for light part, a ROM for medium part and a ROM for dark part so that they are supplied sequentially to the divider and controlled in a manner to provide a different shutter time for each picture pick-up.

The actual picture pick-up sequence is such that, for example, the third image signal is obtained, followed by the second image signal and the first image signal. In prior art, the signal of one picture plane is obtained in 1/60 second, while, in this mode, 1/60 second is divided into three times, so that the shutter time is set in a manner to become 1/120 second, 1/180 second and 1/360 second, that is, 3:2:1.

Figure 3:
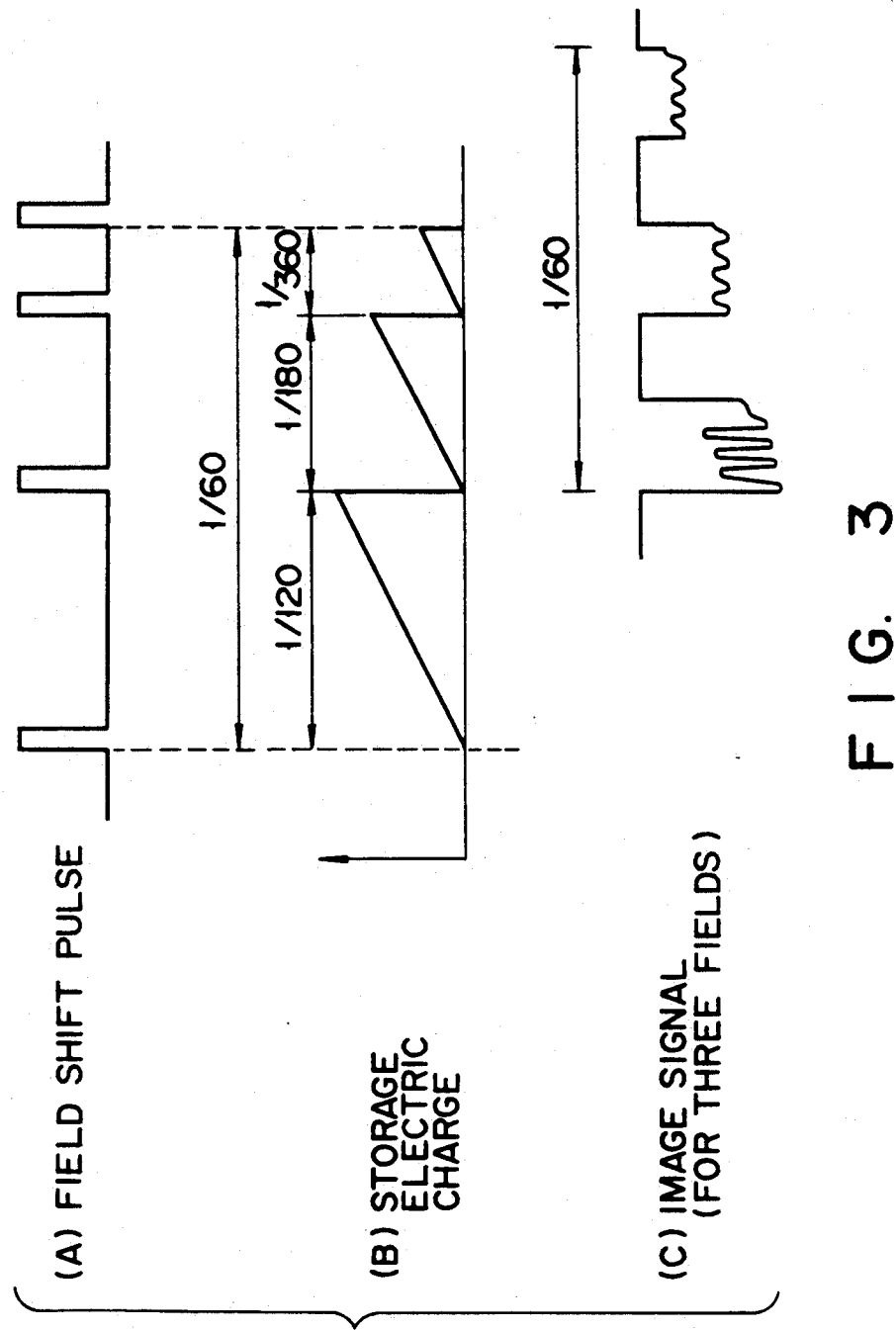
FIG. 3 is a circuit diagram shown to help explain the operation of the circuit in FIG. 2.

When such shutter operation is performed, a timing chart as shown in FIG. 3 is obtained. FIG. 3 (A) shows a field shift pulse, FIG. 3 (B) does a storage state of the signal charge on the photosensitive surface, and FIG. 3 (C) does signals for respective fields, which correspond to the third image signal, the second image signal and the first image signal.

Figure 4:
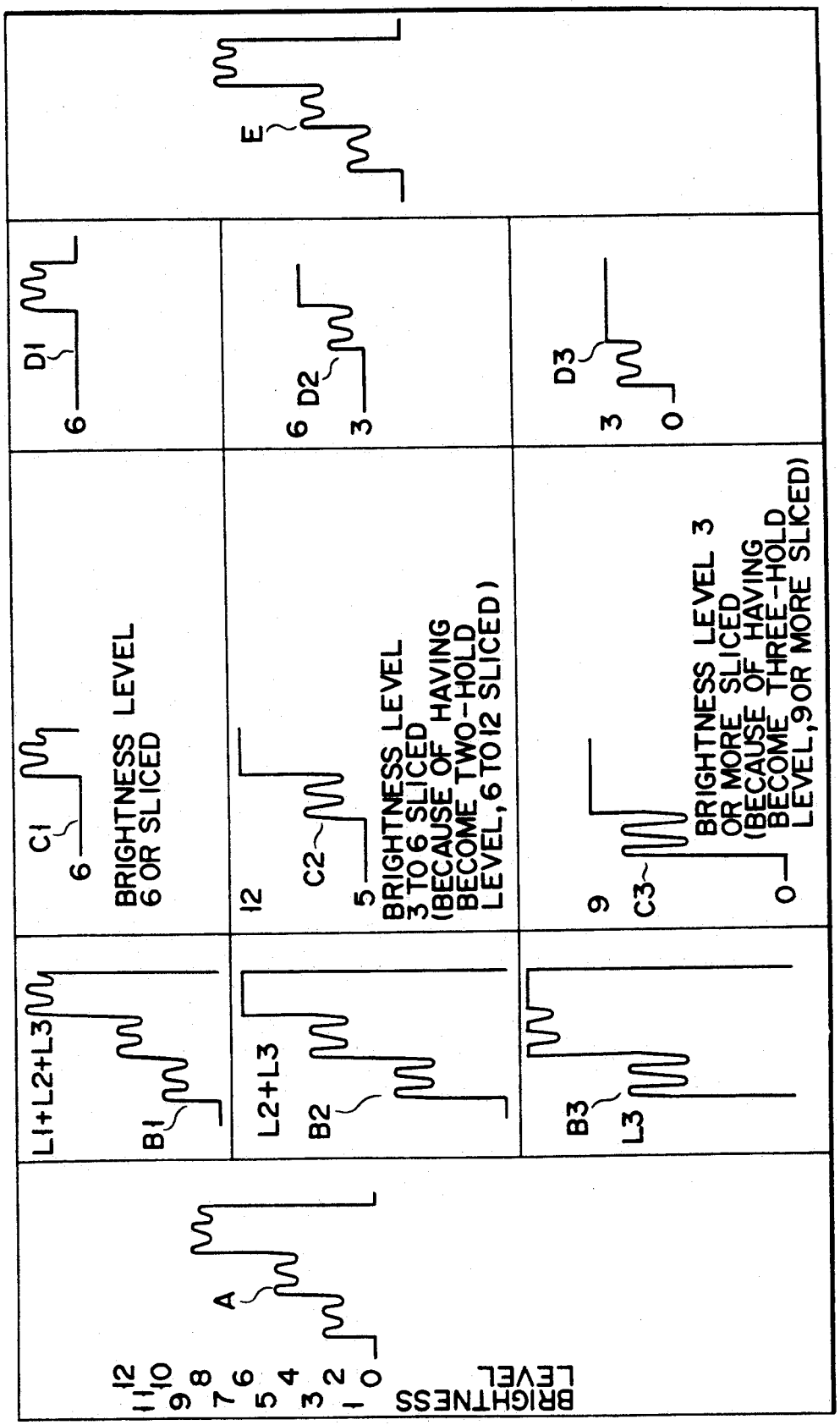
FIG. 4 is an illustrative signal waveform chart shown to help explain also the operation of the circuit in FIG. 2.

FIG. 4 is a chart to help explain the signal waveforms of respective parts of the above-mentioned circuits for processing the signals in FIG. 3 (C). A waveform A is rendered a subject image signal, in which brightness levels 1 to 12 are set. The waveform A shows a case where there is a high-frequency signal changing finely with an amplitude 1 at respective brightness levels 2, 4 and 8. The first image signal B1 has been picked up in the shutter time (1/360 second) for light part, and the second image signal B2 picked up in the shutter time (1/180 second) for medium part.

The third image signal B3 has been picked up in the shutter time (1/120 second) for dark part.

The longer the shutter time becomes, the longer the exposure time is, so that the light part which has been saturated because of the property of the electronic camera is obtained. Accordingly, the second image signal B2 becomes an image signal in which the image of the medium part between the light and dark parts appears clearly, and the third image signal B3 does an image signal in which the image of the dark part appears clearly. For the shutter time of 1/120 second, the signals near the brightness level 2 are expanded three times, and at the level 4 or more, signals reaching the saturation field of the solid-sate image pick-up device are cut. For the shutter time of 1/180 second, the signals at the brightness level 4 are expanded two times, and at the level 6 or more, signals are cut as with the above. For the shutter time of 1/360 second, the signals with the same amplitude as that of the signal A are obtained up to the brightest level.

The first, second and third signals B1, B2 and B3 are sliced in the slice circuits 30a, 30b and 30c, respectively. Respective signals C1, C2 and C3 in FIG. 3 exhibit the relationship between the sliced output signal and the brightness level. For the signal C1, signals at the brightness level 6 or less have been sliced. The signal C2, which has been obtained by taking out the signal A at the brightness level 3 to 6, has actually become two-hold brightness level due to the exposure time (signal B2), so that, when the brightness level is applied to the signal B2, taking out of the signals at the brightness 6 to 12 is sufficient. Further, the signal C3, which has been obtained by slicing the signal A at the brightness level 3 or more, has actually become three-hold brightness level due to the exposure time (signal B3), so that, when the brightness level is applied to the signal B3, slicing of the signals at the brightness 9 or more is sufficient.

Then, the signals B1, B2 and B3 are inputted into their corresponding amplifiers 31a, 31b and 31c to match their respective standard levels. Signals D1, D2 and D3 whose standard levels have been matched to each other are γ corrected, and then composed in the composition circuit 33 and outputted as one image signal E.

Thus, the second embodiment makes up the disadvantage in the performance of the electronic cameras using the CCD, and extends the dynamic range, thereby expanding the actual picture pick-up capability. Accordingly, even though the dynamic range of the light/darkness of a subject is wide, a clear image can be obtained. Heretofore, when an outdoor picture pick-up using an electronic camera was performed, it has been difficult to select an optimum picture pick-up condition so as to obtain an image with a high clearness in light/darkness because of the narrow dynamic range of the solid-state image pick-up device. That is, when the exposure time was made sufficient using the solid-state image pick-up device, an overexposure has resulted so that the light part has been saturated, while an shorter exposure time has caused an underexposure so that the dark part has become unclear. However, when the above-mentioned system is used, the light part and the dark part are separately picked up to compose optimum parts, whereby a clear image can be obtained for all parts from the light to the dark. This means that the dynamic range is substantially extended.

Additionally, an arbitrary selection of the set value allows a signal at a desired level to be obtained, whereby an image can be obtained in which the light part is intentionally saturated or the dark part is intentionally made to be darker to enjoy the picture pick-up technique.

In the above-mentioned embodiment, the brightness level has been divided into three fields to take out the optimum signal of respective fields, but the number of fields may be two fields without being limited to three, and may be three or more fields to be set.

In the above-mentioned signal processing, the respective amplifiers uniforms the respective amplitudes with one-fold, ½-fold and ⅓-fold in a manner to match their original signals. When such information is performed, at first sight, it seems as if the original signals are only reproduced, but in reality the fact is very different from the appearance. That is, in the signals obtained from the image pick-up device, a noise has been always mixed and is normally of about 46 to 50 dB. In such status, a delicate variation in the pattern of respective parts is buried in the noise, thereby being hardly reproduced. However, as previously mentioned, when the signal of the dark part is expanded and picked up, and then compressed, the S/N ratio can be improved by a factor of three. As with the above, in the medium part, the S/N ratio can be improved by a factor of two.

Accordingly, an image can be well reproduced in which the dark part such as the pattern of black hair varies delicately. A subject can also be well picked up and reproduced in which the black part such as black fur coat varies with a delicate contrast. In addition, the S/N ratio is improved, so that a clear image with less noise as a whole can be reproduced. Where the picture pick-up by hierarchy is performed as in the above-mentioned embodiment, the S/N ratio of the light part is not improved, but the signal at the light part is normally compressed in the γ correction circuit, and accordingly, the noise part is also compressed, so that the S/N ratio of the light part raises substantially no problem on the whole.

In the above explanation, the shutter time is controlled to obtain the amplitude with the ratio of 3:2:1 in performing the picture pick-up by hierarchy, but the ratio is not limited to such value, and may be changed depending on the type of the subject. The set value in that case may be given in such a manner that different data have been previously stored in the ROM of the image quality selective circuit 18, and the data thus stored are given to the drive circuit 19 or the image quality changeover circuit 16. For example, in picking up the expression of the face of a person backing on the sun light, by setting the shutter time to, for example, 4:1, and the composing the respective image pick-up signals, both scenes of the background and the person can be picked up with a proper exposure. In this case, in setting gains of the amplifiers corresponding to respective image signals, setting the gains to ½ and 1 rather than ¼ and 1 allows an image to be obtained without making the face image excessively dark.

On the other hand, having described that, in making the exposure energy changed, the shutter time is changed by an electronic shutter to change the luminous energy, this may be done by changing electronically the iris by use of such means as a liquid crystal shutter in which the transmission factor varies with voltage.

Figure 5:
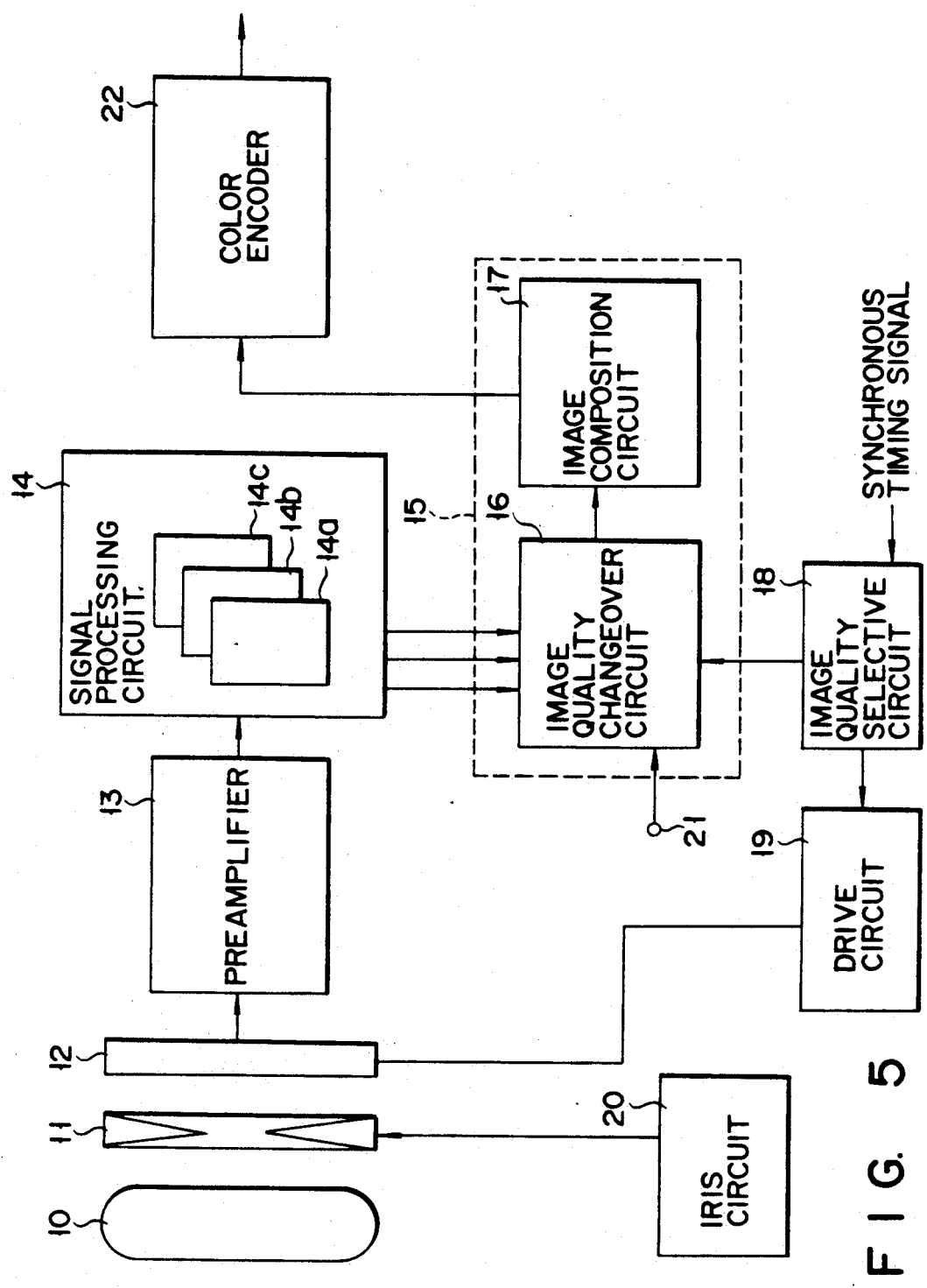

FIG. 5 is another embodiment of the present invention.

The embodiment is arranged in such a manner that in the signal processing circuit 14 are provided, for example, image memories 14a, 14b and 14c, and when a plurality of types of image signals are picked up as in the previous embodiment, the respective signals can be stored in the memories. The image quality changeover circuit 16 is arranged in a manner to select an image signal of one of the memories and supply the signal through the image composition circuit 17 to the color encoder 22. The same references are assigned to other sections which are the same as those of the previous embodiment. In this embodiment, the image quality changeover circuit 16 only selects, introduces and outputs the image signal according to the selection of a user, and the image composition circuit 17 is controlled in the signal through condition. Such arrangement allows three types of image signals, each with a peculiar quality, to be obtained.

Figure 6:
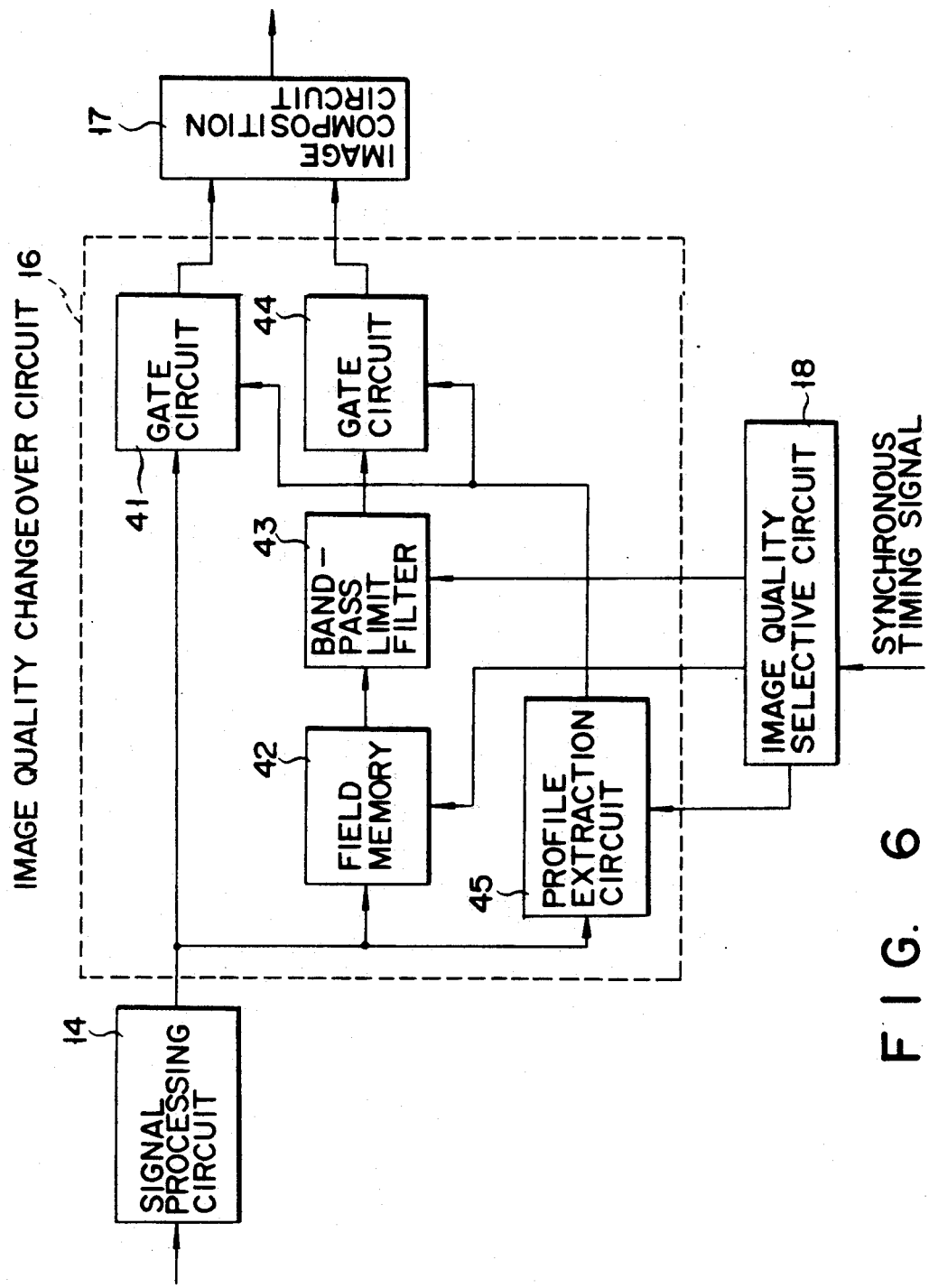

FIG. 6 is a further embodiment of the present invention.

The embodiment has a function similar to photodevelopment technique such that, for example, when picking up two images, a first image signal is worked in a manner to become a soft tone image eliminating sharp tone, and a second image signal is not worked, to obtain an image composed of the both images. According to this function, when the signal picking up a background in the first image is processed as the first image signal, and the signal picking up a human face in the second image processed as the second image signal, an image in which the face is floating with the background softened can be obtained.

The first image signal from the signal processing circuit 14 is stored at once in a field memory 42. Then, the second signal having picked up is inputted into a gate circuit 41 and a profile extraction circuit 45. The profile extraction circuit 45 extracts, for example, the profile of a person to conduct the gate circuit 41 within the scope of the profile and a gate circuit 44 beyond the scope of the profile. The gate circuit 44 is supplied through a band-pass limit filter 43 with the output of the field memory 42.

The band-pass limit filter 43 is a two-dimensional low-pass filter having low-pass characteristics in the horizontal and the vertical directions. The characteristics, though fixed normally, may be adapted to be adjusted from the image quality selection circuit 18. For example, the adjustment may be such that a horizontal cut-off frequency can be selected among 0.5 MHz, 1 MHz and 2 MHz. In this case, the adjustment in the vertical direction is performed in a similar manner by adding a plurality of scanning lines allowing a low-pass component to be obtained. For example, the characteristic of the low-pass filter has been designed to change over in such a manner that setting the horizontal cut-off frequency to 0.5 MHz causes the characteristic thereof to change over to 40 vertical resolution TV lines, setting to 2 MHz causes 160 vertical resolution TV lines, and setting to 1 MHz causes 80 vertical resolution TV lines.

Now assume that a person backing on an outdoor scenery is picked up with a lens iris of about F8 to F11. Also assume that its image signal is of a clear image being in focus. The first image signal passes through the field memory 42 and the band-pass limit filter 43 to become a soft image, and is inputted into the gate circuit 44. The following second image signal is directly inputted into the gate circuit 41. At this point, the gate circuit 41 selects only the signal of the person by the control signal from the profile extraction circuit 45 and outputs the signal, while the gate circuit 44 selects only the signal of the scenery (background) and outputs the signal. The two image signals are inputted into the composition circuit 17.

Thus, an image signal having a soft background and a clear image of the person can be obtained.

The method utilized to detect a profile in the profile extraction circuit 45 includes a method of determining the profile based on the color, a method of determining the profile based on the contrast, and a method of detecting a specific moving object. Further, a specific scope of the image may be previously specified digitally.

In the above-mentioned embodiment, a case has been explained where two successive pictures of the same place are picked up by one image pick-up camera to soften the scenery (background). However, without limiting to the embodiment, an arrangement may be such that an additional field memory is provided on the inlet or the outlet of the gate circuits 41 and 44 to allow the composition of images picked up at separated places. In this case, the composition may be controlled in such a manner that the first image signal has been processed to a soft image and stored in the field memory, or the second image signal has been previously obtained and stored in the field memory, and then the time matching is performed when the both signals are finally composed. As well as the composition of the images picked up by one image pick-up camera, the composition of the images picked up by two cameras with the image signal taken out from the external terminal 21 as described in FIG. 1 may also be performed.

According to this embodiment as mentioned above, an electronic camera can immediately implement a work technique which is used in the development for cameras using general-purpose films, or an effect that a person skilled in photography can obtain using a special lens.

As well as the composition of a person and a scenery as mentioned above, an image in which, with respect to the relationship between a product and a background, the background is made soft and the product floating can also be obtained. A processing can also be performed in which, by focusing on a child running in school sports, its background is made shaded off.

The above-mentioned explanation has referred to an example in which the profile of a person is extracted to obtain an image with the person floating, but where the profile of a subject such as a product has been previously defined, the profile data may have been registered in the memory of the profile extraction circuit 45. This allows a complex profile extraction processing to be neglected. The circuit may not be always used in such a manner that a profile is extracted and the inside of the profile is made clear, but be used in such a manner that a desired area (for example, circle) has been registered in the profile extraction circuit or in a memory separately provided, and only the scope is made clear and the other field made soft.

Figure 7:
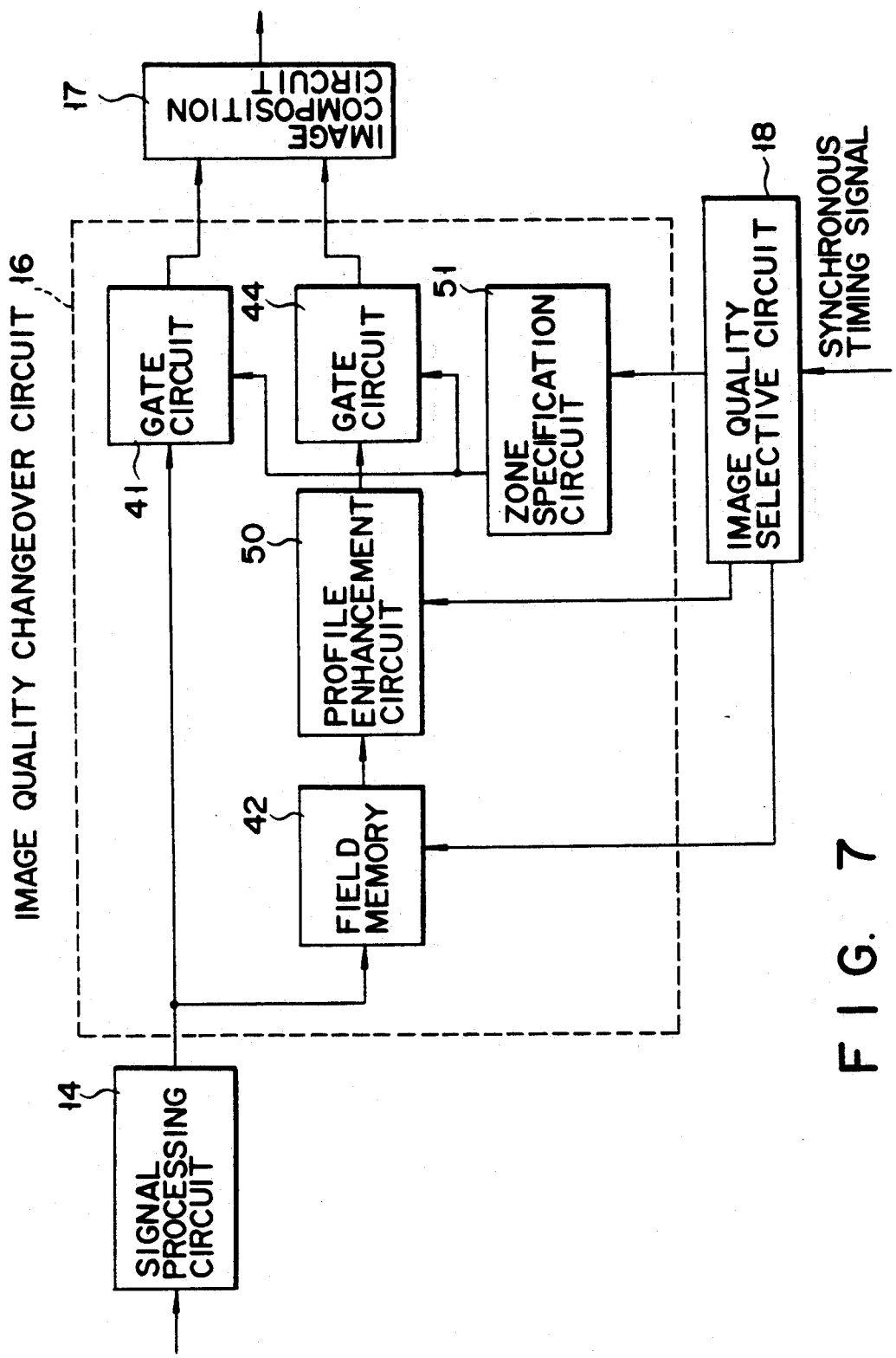

FIG. 7 is yet another embodiment of the present invention. The embodiment has been arranged in such a manner that the first image signal is transformed to enhance a specific frequency component, while the second image signal is not worked, and both signals or part of them are composed to obtain an image in which an unclear part is made more clear. Accordingly, a processing can be performed in which, even if the whole image is unclear in normal condition, only the part to which a user wants to pay attention is made clear.

The image signal from the signal processing circuit 14 is supplied to the gate circuit 41 and the field memory 42. The output of the field memory 42 is inputted into a profile enhancement circuit 50. The profile enhancement circuit 50, which includes vertical and horizontal high-pass filters, enhances and adds a high frequency component to its original signal, and then outputs the resultant signal. For example, with respect to the vertical direction, using a delay circuit of 2 horizontal periods (2H) to 3 horizontal periods (3H), a differential signal between a delayed signal and a non-delayed signal is produced to take out a vertical high-frequency component. With respect to the horizontal direction, profile enhancement is performed by an aperture correction circuit for enlarging the amplification factor of signal components in a specific frequency band. At this point, setting of an enhancement frequency and the extent of enhancement are determined by the control signal from the image quality selective circuit 18.

The image quality selective circuit 18 supplies the control signal to also a zone specification circuit 51, thereby specifying the takeout area of the part to be enhanced on profile. The zone specification circuit 51 controls the gate circuits in a manner to conduct the gate circuit 44 and not to conduct the gate 41 for the selected period of the image signal enhanced on profile, and not to conduct the gate circuit 44 and to conduct the gate circuit 41 for the other period. This allows an image signal in which part of the picture plane is enhanced on profile and made clear to be obtained from the composition circuit 17.

This embodiment has been explained assuming that the zone specification circuit 51 is provided, and part of the picture plane (for example, center circular area) is enhanced on profile. However, the whole picture plane may be enhanced on profile. In that case, only the gate circuit 44 is turned on. As in the previous embodiment, only the area of a specific subject (for example, face of a person) may be selected by the profile extraction, and be subjected to the profile enhancement processing Reversely utilizing the profile enhancement processing, the high frequency component may also be subtracted from the original signal to obtain an image effect of shading off the image FIG. 8 is a still further embodiment of the present invention.

The embodiment has been arranged in such a manner that a specific color component of the first image signal is enhanced, while the second image signal is not worked, thereby allowing the composition of the signal enhanced on color and said second image signal. This embodiment permits an effective image to be obtained where a specific moving subject is traced and monitored.

The image signal from the signal processing circuit 14 is inputted into the gate circuit 41 and the field memory 42. The output of the field memory 42 is inputted into a color enhancement circuit 52. In the color enhancement circuit 52, the gain of a specific color signal is controlled based on the control signal from the image quality selective circuit 18. The signal on the input of and the signal on the output of the color enhancement circuit 52 are processed for differential operation, and utilized for detection of the timing of an enhanced part. For the color enhancement timing directed by the timing detection signal, the gate circuit 44 is conducted and the gate circuit 41 is not conducted, and for the other period, the gate circuit 44 is not conducted and the gate circuit 41 is conducted. This allows an image signal in which only the specific color part is enhanced to be obtained from the composition circuit 17.

The color enhanced part is, for example, an area where the level of the differential signal between fields is a required value or more. The fact that the level of the differential signal between fields is a required value or more means that the area is a moving picture.

The timing detection signal has been supplied through the zone specification circuit 51 to the gate circuits 41 and 42. However, the zone specification circuit 51 may further be controlled by the image quality control circuit 18 to obtain the logical sum of the timing detection signal from an enhanced part detection circuit 53 and the zone specification signal, thereby enhancing the moving picture on color in only the specified area.

In the above-mentioned embodiment, the changeover of the output signal from the gate circuit 41 and the signal enhanced on color has been performed, but if the gate circuit 44 is always conducted and the gate circuit 41 always not conducted, an image will be obtained in which a specified color is enhanced on the whole.

The method of controlling the color signal is not limited to the above-mentioned embodiment, and may include various methods.

The above-mentioned embodiment has been explained assuming that the gain of one of signals R, G and B is controlled when the color signal is enhanced, but the gain either of a signal (R - Y) or a signal (B - Y) may be controlled. Such control causes only a desired part to become deep in the picture plane, thereby allowing a definite distinction from the other part. For example, when only the moving subject is to be enhanced on color, only the moving subject (for example, animal in a grassy plain) is distinguished from the other part, thereby providing an easy observation.

Various methods are available to set the part to be enhanced on color. For example, in addition to the method of specifying a zone as in the examples previously described, a method may be used with which the output from the above-mentioned profile enhancement means and band-pass limit means, and the output from the movement detection means are utilized to set the enhanced part. For example, an image within the scope encircled with a profile, or an image including a specific frequency band component can be specified.

While, in the above-mentioned embodiment, the performing of the color enhancement as image quality changeover has been explained, conversely a color elimination processing may be performed.

A color elimination circuit may be arranged in such a manner that the section of the color enhancement circuit 52 in FIG. 8 is replaced with an elimination circuit, and the section of the enhanced part detection circuit 53 in FIG. 8 replaced with an elimination detection circuit. The elimination method includes a method of eliminating color by specifying one or a plurality of the signals R, G and B, and a method of eliminating color by specifying either or a plurality of the signals (R - Y) and (B - Y). Specifically, the gain of a specified color signal (or color differential signal) is made zero. Making zero the gain of the both paths of two color differential signals causes only the brightness signal Y to remain.

Such function allows an image in which a subject is a color image and its background is monochrome to be obtained, and only the part to which attention is paid to be displayed with color. Such display can be utilized, for example, to obtain the promotion picture of a product.

Figure 9:
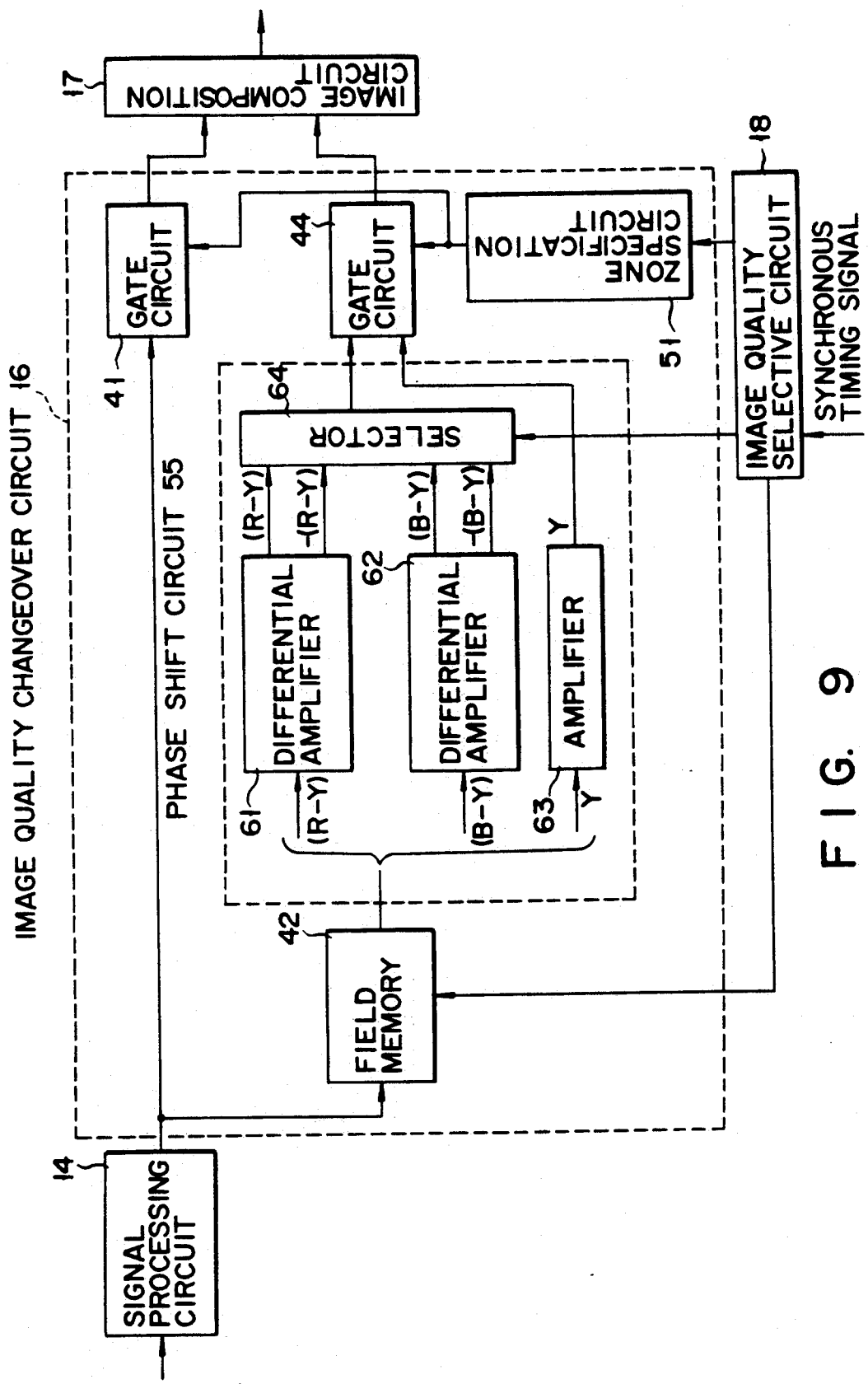

FIG. 9 shows an embodiment arranged in a manner to perform phase-shift control for a color signal. That is, a phase-shift circuit 55 is provided on the path between the field memory 42 and the gate circuit 44, thereby allowing the color of the image signal through the path to be changed. The phase-shift circuit 55, specifically, has a differential amplifier 61 to which the signal (R - Y) from the field memory 42 is supplied, a differential amplifier 62 to which the signal (B - Y) is supplied, and an amplifier 63 to which the brightness signal Y is supplied. The signals (R - Y), -(R - Y), (B - Y) and -(B - Y) from the differential amplifiers 61 and 62 are supplied to a selector 64. The selector 64 can select and introduce an arbitrary color differential signal based on the control signal from the image quality selective circuit 18, and input the color differential signal into the gate circuit 44. The gate circuit 44 selects and introduces the output from the selector 64 and the brightness signal from the amplifier 63 at an interval specified by the zone specification circuit 51, and outputs the introduced signals to the composition circuit 17. The composition circuit 17 is supplied also with the output from the gate circuit 41.

Although the basic operation of the above-mentioned embodiment is the same as that of the previous embodiment, according to this embodiment, for example, selecting the signals -(R - Y) and -(B - Y) instead of the signals (R - Y) and (B - Y) causes a complementary color signal to be obtained, whereby an image giving a visual sensation of just seeing a negative film can be obtained. Additionally, the method of obtaining various image effects by processing the color signal also includes a method of variably controlling the phase of a color complementary carrier wave. A method may also be used by which the phase of the color complementary carrier wave is changed in a specific area of a picture plane to make the color phase of an image different from that of the other part, thereby paying attention to said area.

Where a subject part of which has a color temperature different from the other part is picked up, a camera having such a function also becomes effective when an image whose color has been correctly reproduced is to be seen, by changing the color phase of a specific part. For a scene such as an outdoor landscape, an image whose color has been changed can be obtained by shifting intentionally the color phase.

Figure 10:
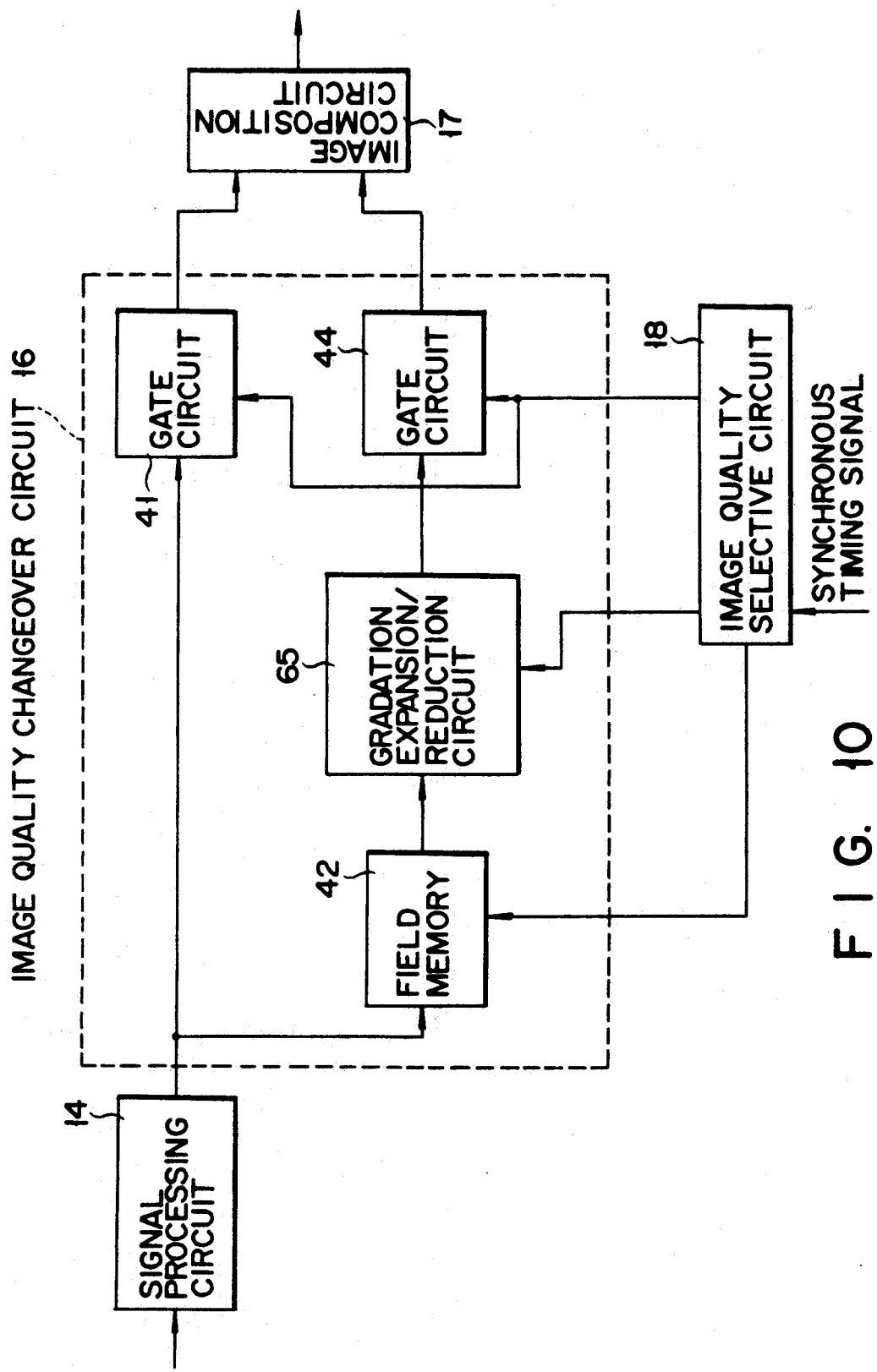

FIG. 10 is an additional embodiment of the present invention.

This embodiment is an example in which a gradation expansion/reduction circuit 65 is provided between the field memory 42 and the gate circuit 44. The image signal on the path is adjusted for contrast by adjusting the gradation. Accordingly, where a subject image, for example, has been selected as the image signal on the path of the field memory 42, and a background image, for example, has been selected as the image signal on the path of the gate circuit 41, when the gradation of the subject image is expanded, an image effect of floating the subject image is obtained in a composed image.

The gradation expansion/reduction can be implemented, specifically, by changing the $\gamma$ characteristic.

Although originally the image signal introduced from an image pick-up device is conventionally processed for $\gamma$ correction, the signal thus processed for $\gamma$ correction is further recombined by setting the $\gamma$ characteristic to $\gamma = 1$ or $\gamma = 1.2$ in this embodiment.

Thus, in this embodiment, the image processed in the above-mentioned manner can be inserted into a part of the whole image. For example, where there is an area with an unclear contrast in the whole image, when the signal of the area is processed for gradation control, the contrast of the part is enhanced to become clear.

FIG. 11 is an additional embodiment of the present invention.

This embodiment is an example in which a mosaic special circuit 66 is provided between the field memory 42 and the gate circuit 44. The circuit 66 converts, for example, an inputted image signal having been implemented with 8-bit gradation into an image signal implemented with 6-bit or 4-bit gradation. Although such bit conversion for an image signal causes the signal to become somewhat unnatural with respect to gradation, the noise contained quantity is reduced, thereby improving substantially the S/N ratio. For example, where an image with less noise is to be obtained by enhancing the image of its background blue sky, such conversion is effective. This is because the change in color for blue sky is not complex even when the bit reduction is performed. This embodiment which includes the bit conversion function can also be applied to the case where an image part of which is shaded off is to be obtained by expressing the part of the image in the least number of bits.

Figure 12:
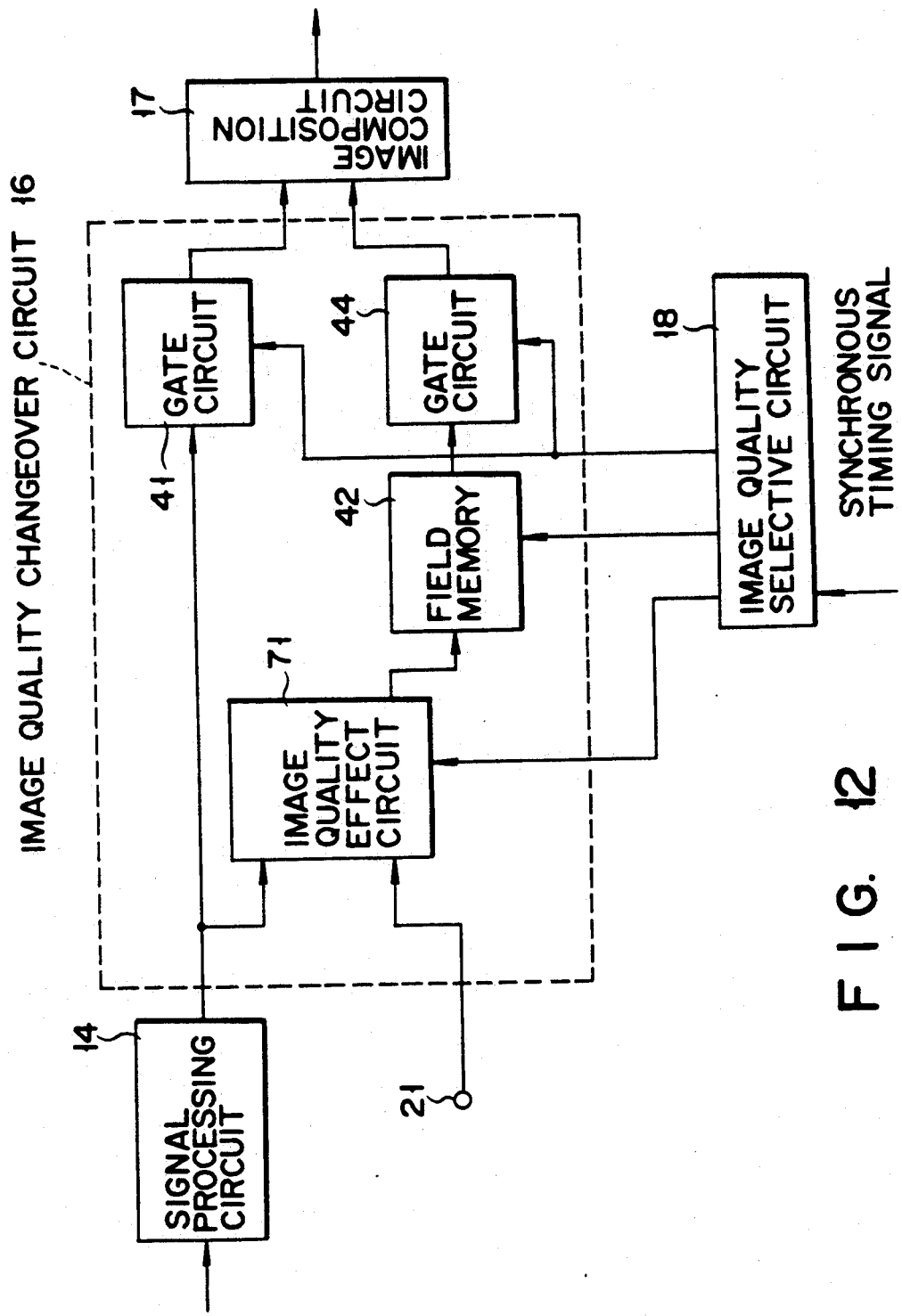

FIG. 12 is an additional embodiment of the present invention.

In this embodiment, the external terminal 21 is provided for the image quality changeover circuit 16. From the terminal 21 can be supplied the output of an electronic camera or that of an external apparatus.

The image quality changeover circuit 16 has an image quality effect circuit 71 into which the image signal from the signal processing circuit 14 or that from the external terminal 21 can be inputted. The image quality effect circuit 71 processes either of the inputted image signals based on the control signal from the image quality selection circuit 18. For example, into the image quality effect circuit 71 have been built the profile emphasis means, band-pass limit means, color enhancement means and the like as described in the previous embodiments. The image signal processed in the image quality effect circuit 71 is stored at once in the field memory 42. Then, the signal is read from the memory with the timing matched, for example, when the image signal from the signal processing circuit 14 is supplied to the gate circuit 41 by the next image pick-up. The gate circuits 41 and 44 are controlled in such a manner that one of the circuits is conducted and the other of the circuits is not conducted depending on the timing signal from the image quality selective circuit 18. This allows the image pick-up signal and the signal from the field memory 42 to be composed in the composition circuit 17.

The timing at which the gate circuit 44 is conducted and controlled is performed where the output of the field memory 42 includes a component of a frequency band, or is an area encircled with a profile component, or includes a specific color component. This is the same as the principle of operation described in the previous embodiment.

As in the above-mentioned embodiment, supplying directly the image signal from the external input terminal to the image quality changeover circuit 16 allows the deterioration of the S/N ratio to be reduced and the image to be easily composed.

Heretofore, in broadcasting stations, the output signals of a plurality of cameras have been inputted into a frame synchronizer to be subjected to various image processings. However, with this method, respective camera outputs are converted once into the video signals of the NYSC system or those R, G and B and shaped as independent video signals, and then subjected to image processing again. Accordingly, the signal processing system has an elaborate and complex arrangement. This may cause the image quality to deteriorate. On the other hand, in the system of the present invention, the image composition processing can be obtained using the external input signal in picking up an image. Accordingly, the image composition without deteriorated image signal can be obtained. Further, a first electronic camera and a second electronic camera are operated normally taking an external synchronization. Thus, the horizontal and vertical scannings between the cameras are synchronized with each other, whereby the system can be used as an inexpensive and practical image composition system without requiring an elaborate frame synchronizer.

Where the composition of an external input image signal and a picture pick-up image signal is desired, in this system, it is possible to have the external input image signal stored previously in the field memory. When a picture is picked up, the image signal in the field memory is read, as required, to allow the image signal and the picture pick-up image signal to be composed. Thus, one program easily edited in performing picture pick-up can also be produced.

Further, the above-mentioned system can perform the editing process even in the midst of the synchronous picture picking up by the first and second cameras. At this point, the field memory 42 is set in a manner to be changed over to either a through condition or a storage condition by the control signal from the image quality selection circuit 18. For example, an image can be obtained in such a manner that a close-up image is inserted into part of the whole image while seeing the whole scenery and tasting an atmosphere obtained by taking the close-up of an important part with the second camera while picking up the whole scene with first camera. The system can also be utilized effectively in the case where the movement of a subject is to be analyzed by picking up the same subject at different angles with the first and the second cameras and by changing over alternately the gate circuits 41 and 42.

As the external input signal, the signal from the electronic camera for picking up a still picture may be used. For example, where a user wants to pick up a picture at a decisive moment as a still picture, the external input image signal has been stored in the field memory and thus can also be utilized for the confirmation of such picture pick-up. Also, a processing can be performed in which the image signal (scenery and row of stores and houses of foreign countries) of the electronic camera is used as the signal for background, and into the signal is inserted the image signal of the subject thus picked up.

Further, as the external input signal, the signals R, G and B from video tape recorders or television receivers may be used. Where the signal from video tape recorders is used, it is desirable that the signal is used by providing of a time axis correction circuit directly behind the inlet terminal 21 to cancel a time axis variation.

As previously explained, according to the present invention, having one camera provided with an image signal processing function allows various image processing to be obtained, the disadvantage of the solid-state image pick up device when picking up an image to be made up, and a multi-function digital CCD camera with a variety of convenient uses to be obtained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A multi-function digital CCD camera comprising:
   an image pick-up lens for receiving light from a subject;
   a solid-state image pick-up device having an imaging surface on which an image of said subject is formed by light from said image pick up lens, said pick up device providing a signal indicative of said image;
   a signal processing circuit for shaping said signal from said solid-state image pick-up device into an image signal;
   image quality control means for receiving a plurality of image signals, including said image signals from said signal processing circuit, said image signals received being first and second image signals picked up in first and second shutter times of said solid-state image pick-up device, said image quality control means comprising a plurality of processing paths into which said image signals are input, each of said processing paths having a particular signal processing characteristic for composing an output image signal;
   image quality selective means for controlling, responsive to an external operation, the types of processing characteristics applied to the respective image signals within the image quality control means;
   drive circuit means responsive to the settings of said image quality selective means, for electrically driving said solid-state image pick-up device;
   an encoder which receives said output image signal from said image quality control means and encodes said output image signal in a video signal.

2. A multi-function digital CCD camera as set forth in claim 12, wherein said image quality control means has a first processing path on which said first image signal is amplified at a first level and a second processing path on which said second image signal is amplified at a second level different from said first level.

3. A multi-function digital CCD camera as set forth in claim 12, wherein said plurality of image signals received by said image quality control means are first and second image signals from said solid-state image pick-up device, and said image quality control means has first and second processing paths on which said first image signal and said second image signal are controlled for gain, respectively, at different levels.

4. A multi-function digital CCD camera as set forth in claim 1, wherein said image quality control means has a signal processing path including a band-pass limit filter.

5. A multi-function digital CCD camera as set forth in claim 1, wherein said image quality control means has a signal processing path including a profile enhancement circuit.

6. A multi-function digital CCD camera as set forth in claim 1, wherein said image quality control means has a signal processing path including a color enhancement circuit.

7. A multi-function digital CCD camera as set forth in claim 1, wherein said image quality control means has a signal processing path including a color phase-shift circuit.

8. A multi-function digital CCD camera as set forth in claim 1, wherein said image quality control means has a signal processing path including a gradation expansion/reduction circuit.

9. A multi-function digital CCD camera as set forth in claim 1, wherein said image quality control means has a signal processing path including a mosaic special circuit for performing bit conversion.

10. A multi-function digital CCD camera as set forth in claim 1, wherein said image quality control means has an external input terminal through which an image signal from an electronic camera or an external apparatus such as a video tape recorder can be introduced.

11. A method of processing signals of a multi-function digital CCD camera, comprising the steps of:

receiving light from a subject to be imaged by an image pick-up lens;

imaging said subject on an imaging surface of a solid state pick up device and producing an output indicative thereof;

signal processing said output of said solid-state image pick-up device output into image signals;

image processing said image signals in processing paths having particular image processing characteristics determined by external operation;

compiling said processed image signals in an image quality control means; and encoding said output image signal from said image quality control means into a video signal having a required mode.

* * * * *